United States Patent [19]

Kaminsky et al.

[11] Patent Number: 4,841,004

[45] Date of Patent: Jun. 20, 1989

[54] PROCESS FOR THE PREPARATION OF A 1-OLEFIN STEREOBLOCK POLYMER

[75] Inventors: Walter Kaminsky, Pinneberg; Maria Buschermöhle, Hamburg, both of Fed. Rep. of Germany

[73] Assignee: Hoechst Aktiengesellschaft, Frankfurt, Fed. Rep. of Germany

[21] Appl. No.: 125,342

[22] Filed: Nov. 25, 1987

[30] Foreign Application Priority Data

Nov. 29, 1986 [DE] Fed. Rep. of Germany ....... 3640948

[51] Int. Cl.$^4$ ........................... C08F 4/64; C08F 10/06
[52] U.S. Cl. ..................................... 526/160; 556/53; 526/351; 502/117
[58] Field of Search ........................................ 526/160

[56] References Cited

U.S. PATENT DOCUMENTS 4,522,982  6/1985  Ewen .
4,542,199  9/1985  Kaminsky et al. .

FOREIGN PATENT DOCUMENTS 185918  7/1986  European Pat. Off. .

Primary Examiner—Edward J. Smith
Attorney, Agent, or Firm—Connolly & Hutz

[57] ABSTRACT

Stereoblock polymers of 1-olefins having long isotactic sequences are obtained at industrially favorable polymerization temperatures using a catalyst which comprises a metallocene compound having cyclopentadienyl radicals which are substituted by chiral groups, and an alumoxane.

2 Claims, No Drawings

PROCESS FOR THE PREPARATION OF A 1-OLEFIN STEREOBLOCK POLYMER

DESCRIPTION

The invention relates to a process for the preparation of a stereoblock polymer having long isotactic sequences.

Stereoblock polymers are homopolymers whose molecule chains isotactic sequences having opposed configurations alternate with one another.

A process is known for the preparation of polypropylene which has a blocklike structure and in which the isotactic sequences are 2 to 17 monomer units long (cf. U.S. Pat. No. 4,522,982). The catalyst employed is a metallocene of a metal of group 4b, 5b or 6b of the periodic table, for example titanium, vanadium or hafnium, in particular titanium. This metallocene is a mono-, di- or tricyclopentadienyl-or substituted cyclopentadienyl-metal compound. The cocatalyst is an aluminoxane.

However, the titanocenes preferably used are not sufficiently thermally stable in dilute solution to be usable in an industrial process. In addition, products having relatively long isotactic sequences (n greater 6) are obtained in this process only at very low temperature ($-60°$ C.). Finally, the cocatalysts must be employed in comparatively high concentration in order to achieve a sufficient catalyst yield, which leads to the necessity for removing, in a separate purification step, the catalyst residues contained in the polymer product.

It is furthermore known that exclusively atactic polymer is obtained when a catalyst based on the bis-cyclopentadienyl compounds of zirconium and alumi-noxane is used in the polymerization of propylene (cf. EP-A No. 69951).

Finally, highly isotactic polypropylene can be prepared using soluble, stereorigid, chiral zirconium compounds (cf. EP-A No. 185,918).

The object was to find a polymerization process in which stereoblock polymers having long sequences are obtained in high yield at favorable process temperatures and relatively low alumoxane concentration.

It has been found that the object can be achieved when the catalyst used is a metallocene compound containing cyclopentadienyl radicals which are substituted by chiral groups, and an alumoxane.

The invention thus relates to a process for the preparation of a 1-olefin stereoblock polymer through polymerization of a 1-olefin of the formula R—CH=CH$_2$ in which R is an alkyl group having 1 to 28 carbon atoms, at a temperature of $-60°$ to $100°$ C., at a pressure of 0.5 to 60 bar, in solution, in suspension or in the gas phase, in the presence of a catalyst which comprises a transition metal compound and an alumoxane, wherein the polymerization is carried out in the presence of a catalyst whose transition metal compound is a metallocene compound of the formula I

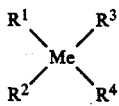
(I)

in which
$R^1$ and $R^2$ are identical or different and denote a halogen atom, $C_1$- to $C_{10}$-alkyl, $C_6$- to $C_{10}$-aryl, $C_2$- to $C_{10}$-alkenyl, $C_7$- to $C_{40}$-arylalkyl, $C_7$- to $C_{40}$-alkylaryl or $C_8$- to $C_{40}$-alkenylaryl, $R^3$ and $R^4$ are identical or different and denote a substituted cyclopentadienyl radical, where this radical contains one or more chiral centers and has been produced by reaction of an alkali metal cyclopentadienide with a chiral alcohol, and where Me is titanium or zirconium, and where the alumoxane is one of the formula II

(II)

for the linear type and/or one of the formula III

(III)

for the cyclic type, where, in the formulae II and III, $R^5$ denotes methyl, ethyl or isobutyl and n is an integer from 4 to 20, and the stereoblock polymer prepared by this process.

In formula I, Me is preferably zirconium and $R^1$ and $R^2$ preferably denote a halogen atom or an alkyl group, preferably methyl, in particular a chlorine atom. $R^3$ and $R^4$ are produced by reaction of an alkali metal cyclopentadienide, preferably sodium cyclopentadienide, and, for example, one of the following chiral alcohols:

Thujyl alcohol; neothujyl alcohol; cis- or trans-sabinol; 2,5-dimethyl-4-vinyl-2,5-hexadien-1-ol; lavandulol; isopulegol; neoisopulegol; cis- or trans-pulegol; isomenthol; neomenthol; neoisomenthol; menthol; cis- or trans-$\Delta^{1(7)}$-p-menthen-2-ol; cis- or trans-$\Delta^{1(7)8}$-p-menthadien-2-ol; dihydrocarveol; neodihydrocarveol; isodihydrocarveol; neoisodihydrocarveol; carvomenthol; neoisocarvomenthol; isocarvomenthol; neocarvomenthol; perilla alcohol; phellandrol; 2-butanol; cycloisolongifolol; isolongifolol; 2-methylbutanol; 2-octanol; 2-pentanol; phenylethanol; hydroxycitronellal; hydroxycitronellol; cis- or trans-myrtenol; 2,6-dimethyl-3-octene-2,8-diol; 2,6-dimethyl-1-octene-3,8-diol; dihydrocitronellol; citronellol; 2,6-dimethyl-2,7-octadien-4-ol; 2,6-dimethyl-1,7-octadien-3-ol; $\Delta^{1,8}$-p-menthadien-9-ol; $\Delta^1$-p-menthen-9-ol; cis- or trans-sobrerol; cis-m-menthan-5-ol; $\Delta^{4/10}$-caren-5-ol; $\Delta^3$-caren-2-ol; caran-3-ol; isocaran-3-ol; neocaran-3-ol; neoisocaran-3-ol; α- or B-fenchol; borneol; isoborneol; cis- or trans-myrtanol; neoverbanol; neoisoverbanol; cis- or trans-chrysanthenol; cis- or trans-verbenol; isoverbanol; cis- or trans-pinocarveol; pinocampheol; neopinocampheol; isopinocampheol; neoisopinocampheol or methylnopinol.

Of these chiral alcohols, the cyclic ones are preferably employed. Neomenthol is particularly preferred. The metallocene compound which is particularly preferably used is thus bis-neomenthylcyclopentadienylzirconium dichloride.

These compounds can be prepared, for example, in the following fashion.

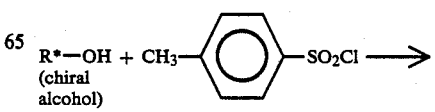
R*—OH + CH$_3$—⟨⟩—SO$_2$Cl ⟶
(chiral alcohol)

-continued

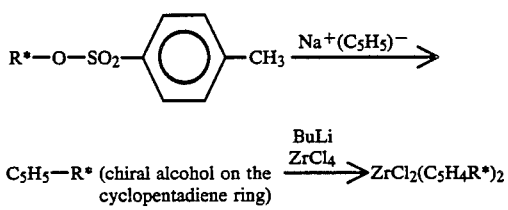

The second component of the catalyst according to the invention is an alumoxane of the formula II $$Al_2OR_4^5[Al(R^5)\text{-}O]_n \quad (II)$$

for the linear type and/or of the formula III $$[Al(R^5)\text{-}O]_{n+2} \quad (III)$$

for the cyclic type. In these formulae, $R^5$ denotes methyl, ethyl or isobutyl, preferably methyl, and n denotes an integer from 4 to 20, preferably 10 to 16.

The alumoxane can be prepared in various ways.

One possibility is to carefully add water to a dilute solution of a trialkylaluminum, by introducing the solution of the trialkylaluminum and the water, in each case in small portions, into an initially introduced, relatively large amount of an inert solvent, and in each case waiting between additions for the end of gas evolution.

In a further process, finely powdered copper sulfate pentahydrate is slurried in toluene, and, in a glass flask under an inert gas, sufficient trialkylaluminum is added at about $-20°$ C. so that about one mole of $CuSO_4.5H_2O$ is available per 4 Al atoms. After slow hydrolysis with alkane elimination, the reaction mixture is left at room temperature for 24 to 48 hours, cooling possibly being necessary to prevent the temperature increasing to above 30° C. The copper sulfate is subsequently filtered off from the alumoxane, dissolved in toluene, and the toluene is removed by distillation in vacuo. It is presumed that the low-molecular-weight alumoxanes condense in this process to form higher oligomers with elimination of trialkyl aluminum.

Finally, alumoxanes are obtained when trialkylaluminum, dissolved in an inert aliphatic or aromatic solvent, is reacted at a temperature of $-20°$ to $100°$ C. with aluminum slats, preferably aluminum sulfate, containing water of crystallization. In this reaction, the volume ratio between the solvents and the alkyl aluminum used is 1:1 to 50:1—preferably 5:1—and the reaction time, which can be checked by means of the alkane elimination, is 1 to 200 hours—preferably 10 to 40 hours.

Of the aluminum salts containing water of crystallization, those are preferably used which have a high content of water of crystallization. Aluminum sulfate hydrate, above all the compounds $AL_2(SO_4)_3.18H_2O$ and $Al_2(SO_4)_3.16H_2O$ having the particularly high content of water of crystallization of 16 or 18 moles of $H_2O$/mole of $Al_2(SO_4)_3$ respectively, is particularly preferred.

The catalyst to be used according to the invention is employed for the polymerization of 1-olefins of the formula $R-CH=CH_2$ in which R denotes an alkyl radical having 1 to 28 carbon atoms, preferably 1 to 10 carbon atoms, in particular one carbon atom, for example propylene, 1-butene, 1-hexene, 4-methyl-1-pentene and 1-octene. Propylene is particularly preferred.

The polymerization is carried out in a known fashion in solution, in suspension or in the gas phase, continuously or batchwise, in one or several stages, at a temperature of $-60°$ to $100°$ C., preferably $-20°$ to $80°$ C. The pressure is 0.5 to 60 bar. Polymerization in the pressure range 5 to 60 bar, which is particularly interesting industrially, is preferred.

In this process, the metallocene compound is used in a concentration, relative to titanium or zirconium, of $10^{-3}$ to $10^{-7}$, preferably $10^{-4}$ to $10^{-6}$ moles of Ti or Zr respectively per liter of solvent or per liter of the reactor volume. The alumoxane is used in a concentration of $10^{-4}$ to $10^{-1}$ mole, preferably $10^{-3}$ to $10^{-2}$ mole, per liter of solvent or per liter of the reactor volume. However, higher concentrations are also possible in principle.

The polymerization is carried out in an inert solvent which is customary for the Ziegler low-pressure process, for example in an aliphatic or cycloaliphatic hydrocarbon; butane, pentane, hexane, heptane, isooctane, cyclohexane and methylcyclohexane may be mentioned as examples of such hydrocarbons. It is furthermore possible to use a petroleum or hydrogenated diesel oil fraction which has been carefully freed from oxygen, sulfur compounds and moisture. Toluene can also be used. Finally, the monomers to be polymerized can also be employed as solvents or suspending agents. The molecular weight of the polymer can be regulated in a known fashion; hydrogen is preferably used for this purpose.

Compared to the known prior art, the process according to the invention is distinguished by the fact that the zirconium compounds preferably used are very temperature-stable in dilute solution, meaning that it is also possible for them to be employed at temperatures up to 80° C. In addition, the alumoxanes used as cocatalysts can be added in a lower concentration than hitherto. Finally, it is now possible to prepare stereoblock polymers having long isotactic sequences at relatively high temperatures, thus reducing the amount of energy required to maintain the process temperature.

EXAMPLE 1

A dry, argon-filled glass autoclave was filled at $-40°$ C. with 250 ml of dry toluene, 300 mg of methylalumoxane having a degree of oligomerization of $n=16$, and 45 g of propylene. $2\times10^{-5}$ mol of bis-neomenthylcyclopentadienylzirconium dichloride was added to this solution.

After a polymerization time of 65 hours, the reaction was terminated, and the polymer was precipitated using ethanol and dried in vacuo.

Yield 51 g of polypropylene, activity 2.6 kg/mmol, viscosimetrically determined average molecular weight 360,000. $^{13}C$ NMR analysis showed an isotactic sequence length of $n_c=6.2$; $M_w/M_n=2$.

EXAMPLE 2

The polymerization was carried out as in Example 1, but at $-20°$ C. The polymerization time was 20 hours.

Yield 26 g of PP, activity 1.3 kg/mmol, average molecular weight 82,000. Isotactic sequence length $n_c=4.9$, $M_w/M_n=2.3$.

EXAMPLE 3

Example 1 was repeated, but the polymerization was carried out at 0° C. The polymerization time was 20 hours. Yield 77 g of PP. Activity 3.9 kg/mmol, average molecular weight 16,000. Isotactic sequence length $n_c=4.6$; $M_w/M_n=1.9$.

EXAMPLE 4

The polymerization was carried out as in Example 3, but at +20° C. The polymerization time was 4 hours. $M_w/M_n=2.0$.

Yield 73 g of PP, activity 3.6 kg/mmol, isotactic sequence length: $n_c=4.6$.

The following table summarizes the examples:

| Example No. | Activity kg/mmol | Contact time yield kg/mmol · h | $M_w/M_n$ | Isotactic sequence length $n_c$ | Temp. (°C.) |
| --- | --- | --- | --- | --- | --- |
| 1 | 2.6 | 0.040 | 2.5 | 6.2 | −40 |
| 2 | 1.3 | 0.065 | 2.3 | 4.9 | −20 |
| 3 | 3.9 | 0.195 | 1.9 | 4.6 | −0 |
| 4 | 3.6 | 0.900 | 2.0 | 4.6 | +20 |

We claim:

1. A process for the preparation of a 1-olefin stereoblock polymer through polymerization of a 1-olefin of the formula R—CH=CH$_2$ in which R is an alkyl group having 1 to 28 carbon atoms, at a temperature of −60° to 100° C., at a pressure of 0.5 to 60 bar, in solution, in suspension or in the gas phase, in the presence of a catalyst which comprises a transition metal compound and an alumoxane, wherein the polymerization is carried out in the presence of a catalyst whose transition metal compound is bis-neomenthylcyclopentadienyl zirconium dichloride, and where the alumoxane is one of the formula II $$Al_2OR_4^5[Al\ (R^5)\text{-}O]_n \qquad (II)$$

for the linear type and/or one of the formula III $$[Al\ (R^5)\text{-}O]_{n+2} \qquad (III)$$

for the cyclic type, where, in the formulae II and III, $R^5$ denotes methyl, ethyl or isobutyl, and n is an integer from 4 to 20.

2. The process as claimed in claim 1, wherein the 1-olefin is propylene.

* * * * *